United States Patent [19]

Braaten

[11] Patent Number: 4,572,785
[45] Date of Patent: Feb. 25, 1986

[54] WATER PURIFIER UNIT

[76] Inventor: Melvin Braaten, 110 Cherokee Ave., Bismark, N. Dak. 58501

[21] Appl. No.: 594,752

[22] Filed: Mar. 29, 1984

[51] Int. Cl.⁴ .................. C02F 1/22; C02F 1/32; B01D 9/04
[52] U.S. Cl. .................. 210/181; 62/542; 62/73; 62/74; 62/123; 62/318; 62/347; 210/182; 210/669; 210/257.1
[58] Field of Search ............... 62/73, 74, 123, 124, 62/317, 318, 347, 532, 542; 210/181, 182, 663, 669, 806

[56] References Cited

U.S. PATENT DOCUMENTS

| | | | |
|---|---|---|---|
| 1,999,712 | 4/1935 | Zorn et al. | 62/74 X |
| 2,090,413 | 8/1937 | Gould | 62/318 X |
| 2,340,721 | 2/1944 | Whitney | 62/532 X |
| 2,696,717 | 12/1954 | Lindenberg et al. | 62/124 |
| 2,705,407 | 4/1955 | Colonna | 62/124 |
| 2,974,102 | 3/1961 | Williams | 210/749 |
| 2,997,856 | 8/1961 | Pike | 62/58 |
| 3,019,611 | 2/1962 | Toulmin, Jr. | 62/58 |
| 3,049,888 | 8/1962 | Bosworth | 62/58 |
| 3,070,969 | 1/1963 | Ashley et al. | 62/124 X |
| 3,132,096 | 5/1964 | Walton | 210/749 |
| 3,212,272 | 10/1965 | Sommers, Jr. | 62/532 X |
| 3,251,192 | 5/1966 | Rich, Jr. et al. | 62/58 |
| 3,290,891 | 12/1966 | DeLano, Jr. et al. | 62/58 |
| 3,338,064 | 8/1967 | Karnofsky | 62/123 X |
| 3,338,065 | 8/1967 | Ashley | 62/532 X |
| 3,344,616 | 10/1967 | Owen | 62/532 |
| 3,367,123 | 2/1968 | Schambra | 62/58 |
| 3,377,814 | 4/1968 | Othmer | 62/58 |
| 3,433,030 | 3/1969 | Jacobs | 62/347 X |
| 3,587,240 | 6/1971 | Martindale et al. | 62/58 |
| 3,628,341 | 12/1971 | Klotz et al. | 62/58 |
| 3,630,042 | 12/1971 | Petsinger | 62/58 |
| 3,667,243 | 6/1972 | Cheng et al. | 62/58 |
| 3,677,405 | 7/1972 | Keith, Jr. | 62/58 X |
| 3,864,932 | 2/1975 | Hsiao | 62/123 |
| 3,892,103 | 7/1975 | Antonelli | 62/58 |
| 3,892,662 | 7/1975 | Stout | 62/58 X |
| 4,153,546 | 5/1979 | Hammel et al. | 210/176 X |
| 4,236,382 | 12/1980 | Cheng et al. | 62/123 X |
| 4,262,489 | 4/1981 | Sakamoto | 62/124 |
| 4,314,455 | 2/1982 | Engdahl | 62/532 X |
| 4,322,291 | 3/1982 | Ho | 210/181 |
| 4,370,865 | 2/1983 | Hibino et al. | 62/124 |

FOREIGN PATENT DOCUMENTS 2405631 10/1974 Fed. Rep. of Germany ........ 62/532

Primary Examiner—Robert Spitzer
Attorney, Agent, or Firm—Bielen & Peterson

[57] ABSTRACT

A water purifier for producing potable water from contaminated water, the purifier includes a crystallizer chamber with a plurality of projecting freeze elements, and a water spray unit which directs a fine spray of water at the freeze elements to produce ice coating on the freeze elements. The purifier also includes a refrigerant unit to periodically chill and warm the freeze elements to alternately produce and release ice shells that are melted to form purified water.

24 Claims, 5 Drawing Figures

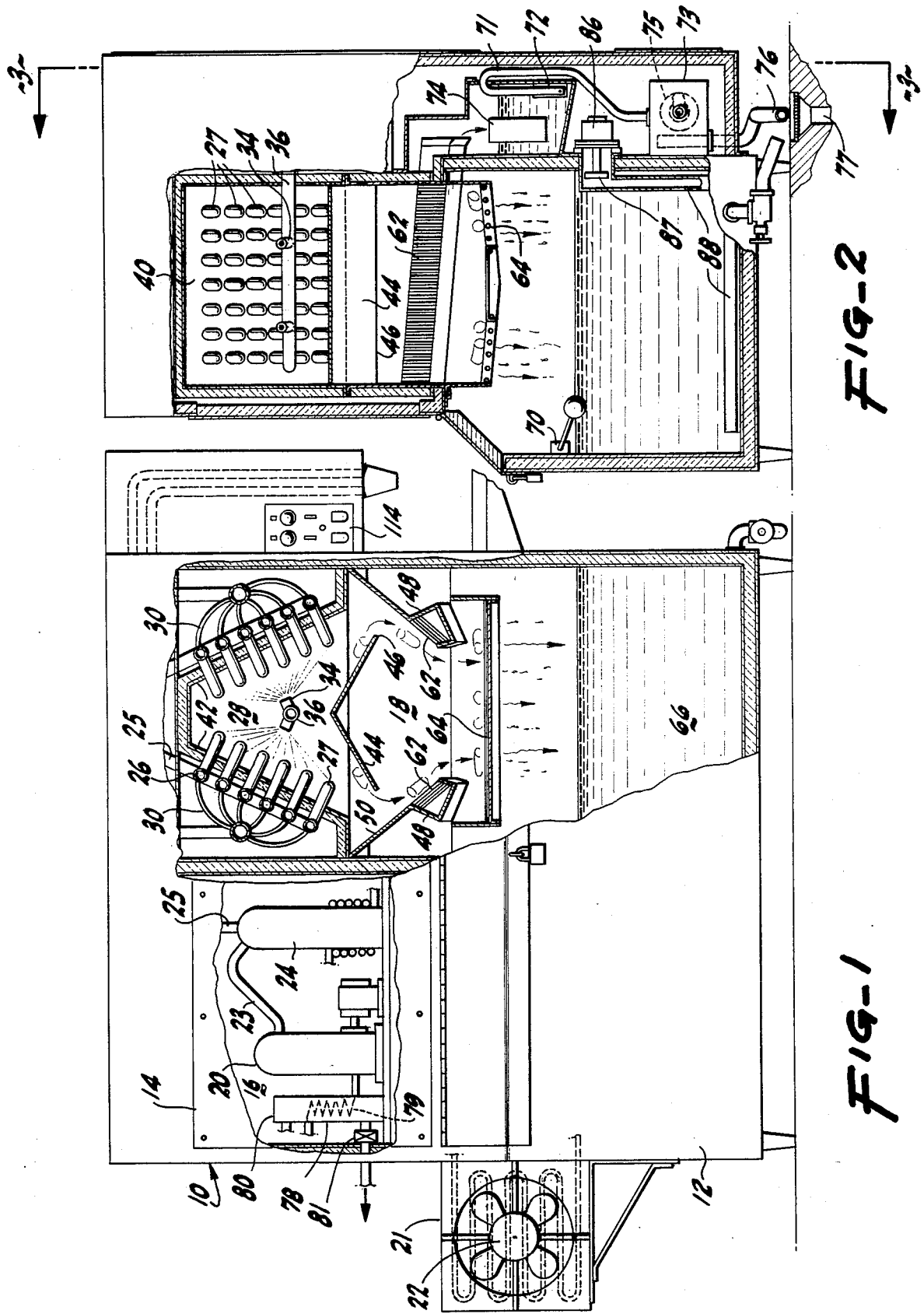

WATER PURIFIER UNIT

BACKGROUND OF THE INVENTION

This invention relates to a device for purifying water and in particular to a water crystallization type purifier in which pure ice crystals are formed in a contaminated water. The ice crystals are separated from the contaminated water and melted to provide a supply of pure water.

There are numerous methods of purifying water. Three primary methods are practical for processing large quantities of contaminated source water: distillation, electrodialysis and crystallization.

Distillation has had wide practical application in purifying contaminated or salt waters. However, low temperature evaporation and condensation of large quantities of water require extensive capital equipment and substantial land areas for efficient operation. High temperature vapor systems require abundant fuel supplies and pressurized heat transfer systems that are subject to corrosion, scaling and failure.

In electrodialysis, two spaced permeable membranes selectively pass positive and negative ions from a salt solution therebetween, to electrodes on the other sides of the membrane. Generally size and cost limitations restrict the use of electrodialysis to limited volumes of mildly saline solutions.

Crystallization has been used in the past, but has had limited application. Because of its advantages as a low temperature process, problems of corrosion and scaling are minimal. Crystallization purification has been used to desalinize sea waters. Both continuous and batch processes have been used to produce quantities of water on large and small scales. The relatively low energy requirement compared to distillation and membrane dialysis makes crystallization an attractive general method for producing purified water. While the principle of purification through freezing has been well known, surprisingly few practical applications of the principle have been implemented.

The water purifier of this invention utilizes a cyclical freeze process to produce purified drinking water from a contaminated or non potable water source. The water purifier employs a design concept that is suitable for low volume purifiers for household use, or high volume purifiers for industrial use. The concept is useable for economical purification of water containing up to 4500 p.p.m. of contaminants. Water having much higher concentrations of contaminants can be purified by multiple passes through the purification system. Sea water, for example, having 22,900 p.p.m. of impurities, can be purified by three passes to obtain potable water of high quality.

The devised water purifier uses a hybred spray process to produce fine droplets that form ice crystals on a refrigerated contact surface. As the ice crystals accumulate they are continually washed by the unfrozen portion of the continuous spray. This process flushes away a contaminated brine film that adheres to the surface of tiny platelets of crystallizing ice. The ice cake that accumulates is periodically removed and melted to provide a supply of pure water.

The hybred spray process was devised to incorporate certain phenomenae reported from a prior investigation of water refrigerant mix systems. In such systems the water is directly mixed with a refrigerant to initiate crystallization from the vaporization of the refrigerant from the water refrigerant mix. In the investigation of a technique for mixing by colliding separate sprays of refrigerant and water, a fine spray of freezing droplets is produced. The crystals formed were substantially smaller than those produced by liquid mixtures of a feedwater and a liquid refrigerant in a crystallizer. The smaller the crystal the less likely that surface films become trapped between the platelets of accumulating crystals.

While direct contact methods of water purification are suitable for large volumes of water, the difficult process of separating the ice crystals from the brine in the resulting slurry makes the process impractical for smaller units. Additionally there is a reluctance to directly mix water with a refrigerant when potable water is sought. This disadvantage is obviated by the use of a heat transfer surface separating the water from the refrigerant.

The problem with surface contact systems, however, is the added cost of the heat transfer components and the additional energy consumption required. In such units the surface is directly washed by a continuous stream of contaminated water which transfers to the exchange surface large amounts of latent heat acquired during a cycling process.

Because surface area is a primary limitation to efficient heat transfer for large volumes of water, applicant has sought to maximize the effective area by two means. First, the contact surface area is increased by the use of a plurality of projecting, thimble-like freeze elements. Second, the surface area of the water is increased by projecting the water at the elements in a fine spray of small droplets to enable rapid formation of seed crystals on contact with the freeze elements or the ice cake formed thereon. The cold atmosphere of the crystallizer aids in reducing the temperature of the droplets close to the freeze temperature before impact. The impact of the droplets has a wash effect, to purge contaminants on the crystals as they accumulate on the freeze elements. Additionally the orientation of the freeze elements allows the contaminated brine to effectively drip from the end of the elements.

As the efficiency begins to diminish, because of ice buildup, the freeze elements are warmed to release the capsules of caked ice. The ice is then melted providing a supply of potable water.

SUMMARY OF THE INVENTION

The water purified of this invention uses a cyclical freeze process to produce a potable water. The purifier has particular application in changing a hard, highly-mineralized, tap water to a high-quality, drinking water.

The purifier is constructed with a unique freeze chamber having a plurality of projecting freeze elements. The finger-like freeze elements substantially increase the effective area for heat transfer. Further, the freeze elements are configured and oriented to provide an effective drip surface allowing the contaminants accumulating in the brine to be purged from the system.

Water from a supply source is pumped to the freeze chamber and forced through spray nozzles directed at the freeze elements. The fine spray, upon contact with the freeze elements, forms fine crystals of pure ice. Unfrozen brine runs to the end of the freeze elements, collecting contaminants forced to the surface of the forming platelets of ice crystals. The brine drips to a reservoir where it is mixed with makeup water for subsequent cycling to the freeze chamber. Periodically, as the brine becomes concentrated, it is discharged, and the reservoir refilled with source water.

The freeze elements are each equipped with internal refrigerant for uniform accumulation of an ice pack on all of the elements. When the ice pack has developed to a point that there is a notable reduction in the efficiencies of the freeze elements, the crystallization stage is stopped and a heated medium is supplied to the freeze elements and onto a collector. The collector is preferably a heat exchanger which can take advantage of the potential heat exchange with the low temperature ice, for example, in cooling the supply water, or in the preferred embodiment cooling the refrigerant from its heated condition after the compression stage.

The pure water from the melting ice is collected in a storage tank and delivered to a spigot for use. The cold waste is stored in a waste sump having a heat exchange coil for cooling incoming supply water. Overflow from the waste sump is discharged to a sewer drain.

Applicant has devised a hybred spray process that effectively conserves the energies of the cycle and makes a surface contact system efficient and economical. The process produces a water of high purity, using a cycled operation as described with reference to the detailed description of the preferred embodiment.

BRIEF DESCRIPTION OF THE DRAWINGS

FIG. 1 is a front elevational view, partially broken away of the water purifier of this invention.

FIG. 2 is a side elevational view partially broken away of the purifier of FIG. 1.

DETAILED DESCRIPTION OF THE PREFERRED EMBODIMENTS

Figure 3:
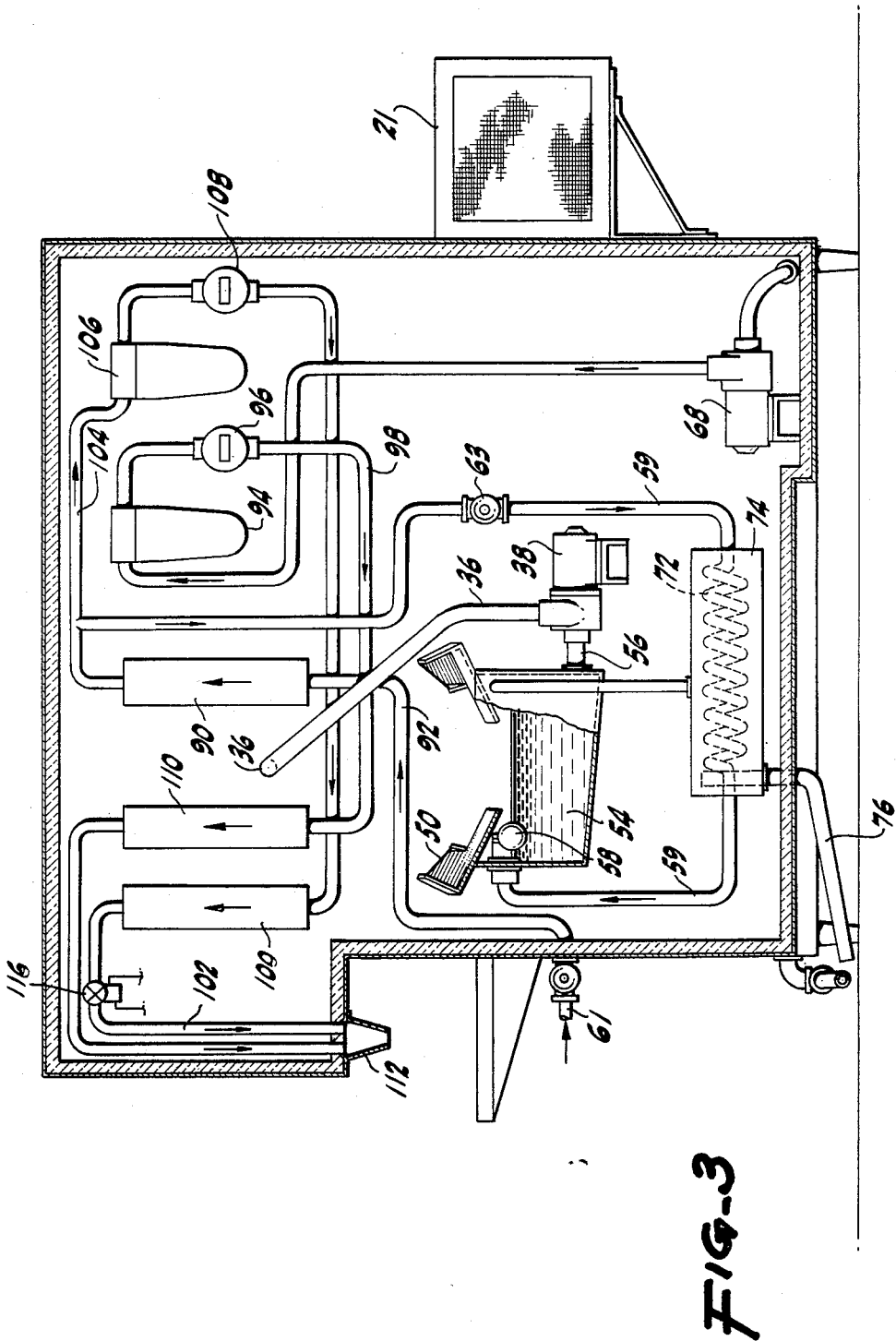
FIG. 3 is a cross sectional view taken on the lines 3—3 of FIG. 2.

Referring to FIGS. 1, 2 and 3 the preferred embodiment of the water purifier is shown. The purifier unit 10 is sized for household or restaurant use to produce a high quality drinking water from a highly mineralized or contaminated water source. The unit described can easily be increased in size for higher volume commercial and industrial applications.

The unit 10, is constructed with an outer cabinet 12, which houses most of the operational components for purifying water from an external water supply. A front panel 14, is shown broken away in FIG. 1 to reveal a compressor compartment 16 and a freeze compartment 18. In the compressor compartment 16 is mounted a refrigerant compressor 20, which compresses a refrigerant gas, for example Freon, to the pressure that it can be condensed by an air cooled condenser 21. The condenser 21 is mounted externally to the cabinet 12 to maximize circulation of air through the condenser 21 by an air fan 22 accompanying the condenser. The condenser can be internally mounted in an oversized cabinet where proper air circulation conduits are provided.

Figure 4:
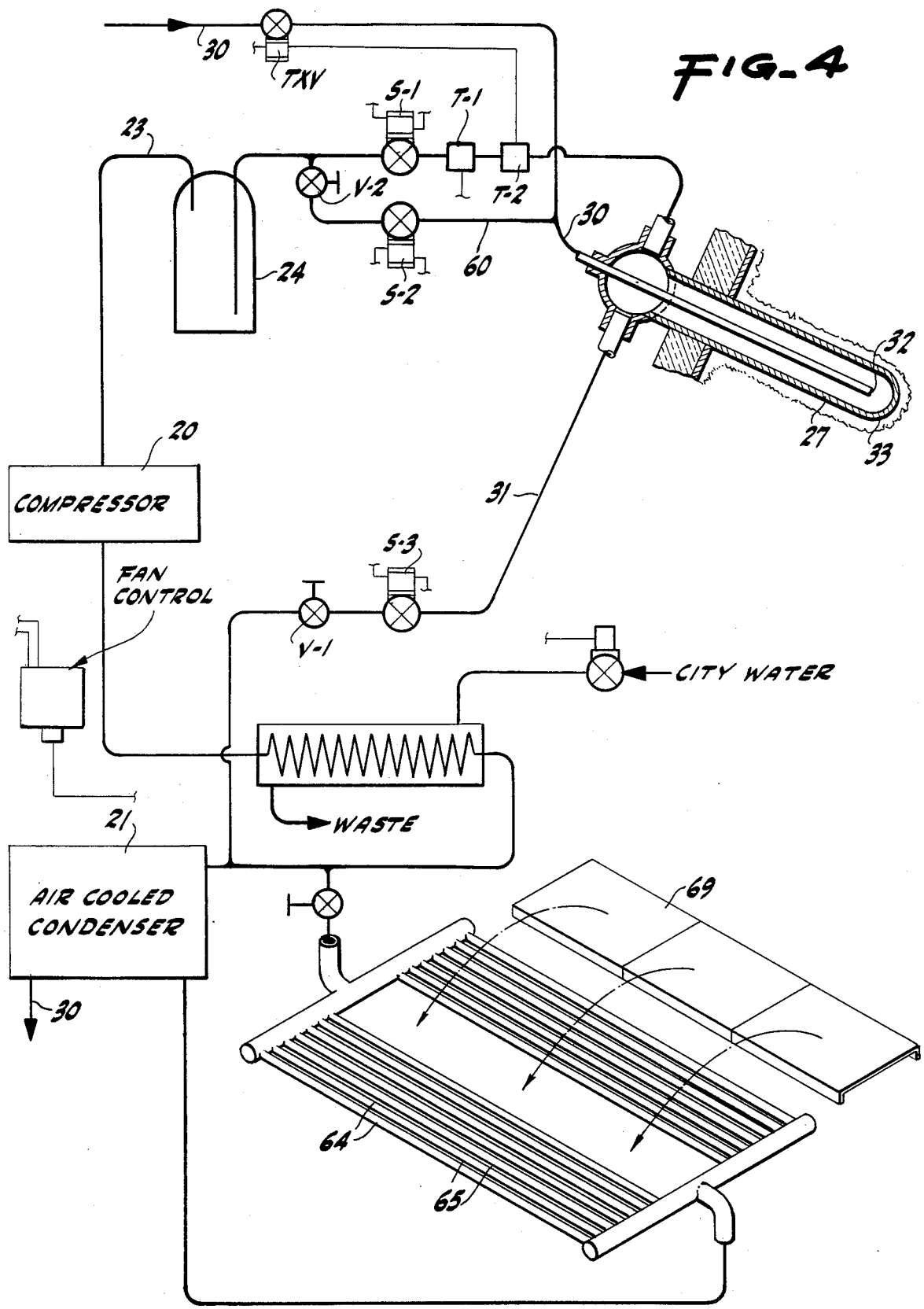
FIG. 4 is a schematic of the primary conduit circuits of the purifier.

The compressor 20, draws expanded refrigerant gas through a suction line 23 that is connected to an accumulator 24 which allows any refrigerant condensate to vaporize. The accumulator 24 has a suction line 25 that divides and connects to a series of manifolds 26. The manifolds 26 are coupled to a plurality of individual freeze elements 27 which project into a crystallizer chamber 28 in the freeze compartment 18. The freeze elements 27 are supplied refrigerant from the condenser through liquid refrigerant feed lines 30. The feed lines 30 have a terminal end 32 within the freeze elements 27 proximate the projecting end 33 of the element as shown in FIG. 4.

When the liquid refrigerant vaporizes within the freeze elements 27 the freeze elements are chilled. A fine spray of water is directed at the freeze elements 27 from a plurality of spray nozzles 34 located on a water tube 36. The water tube 36 is centrally positioned in the crystallizer chamber 28 and connects to a water circulating pump 38 located in the back of the purifier unit 10 as shown in FIG. 3.

The crystallizer chamber 28 is constructed with an insulating polypopylene shell 40 which has a pair of outwardly angled upper walls 42 to orient the array of freeze elements 27 with downwardly angled projections to allow effective run-off of the excess unfrozen brine. The water spray allows sufficient local dwell on impact of the fine droplets to cause seed crystals to form and adhere to the freeze elements or ice pack which accumulates thereon.

The excess brine drips from the ends of the freeze elements 27 onto a polypropylene gable 44 at the bottom of the crystallize chamber where it runs off the gable eaves 46 and into a pair of collector gutters 48. The collector gutters are mounted along the lower edge of the inwardly angled lower insulated walls 50 of the crystallizer chamber 28 to collect any spray run-off from the crystallizer chamber which does not contact the freeze elements. The collector gutters 48 drain into a water reservoir 54 for the circulating supply water. The circulating pump 38 draws water from the supply reservoir 50 through a supply line 56 for delivery to the spray nozzle 34. Makeup water is provided from the water source as required by action of a float valve 58 at the end of the source line 59 which connects to an external supply 61 when manual line valve 63 is open.

When a thick shell of ice has formed on the freeze elements 27, a hot gas bypass line 31 from compressor 20 is opened and hot refrigerant gas enters the hollow freeze elements 27 causing them to warm melting the surface ice and causing the ice shells to fall from the freeze elements 27. The ice shells skid across the gable 44 and drop onto sloped grates 62 covering the collector gutters for the brine. The ice shells skid from the grates 62 to a melt shelf 64 located under the crystallizer chamber. The melt shelf 64 is a stainless steel hollow rack with conduits 65 through which the hot compressor gasses are circulated before being fed to the condenser 21. The melt shelf 64 functions as a effective heat exchanger using the melting ice to effectively cool the compressor gas before it is introduced into the condenser 21 for final condensation to a liquid. The melt shelf also provides pure water derived from the melting ice that is collected in the storage tank 66 where it is drawn for use on activation of a small delivery pump 68. Chilling for water in the purified water storage tank is provided primarily by ice fragments which drop through the rack. A central cover 69, FIG. 4, covering a gap in the rack allows whole ice shells to fall into the tank when desired for warm conditions.

The freeze-release cycles are automatically continued until water in the storage tank reaches a filled level where a float override switch 70 deactivates the cycle. During the melt phase of the cycle, water in the spray lines 36 drains back into the supply reservoir 54 raising the level to the syphon overflow line 71 causing the water in the reservoir to drain completely, or to a level desired by adjustment of a window sleeve 72, into a waste water sump 73. The capacity of the supply water reservoir can be adjusted by inclusion of select sized displacement ballast 74.

Several thermal conservation components are included to conserve energy. The incoming supply water is prechilled by passing through a coil 75 in the waste water sump 73 which holds the chilled waste brine before final discharge through an overflow drain pipe 76 to an axilliary sewer system 77.

Further, a heat sink 78 is connected to the compressor discharge for immediate lowering of the hot compressor gasses. The heat sink has an internal gas coil 79 with a water jacket 80 supplied by source water on activation of a thermatic control valve 81 allowing excessively heated water in the water jacket to be periodically purged to the external sewer system 77.

Additionally, warm condensate from the condenser 21 is conveyed through a coil 84 around the refrigerant accumulator 24 which collects and vaporizes any refrigerant that precipitates before entry into the compressor 20, and concurrently further cools the fluid refrigerant before expansion in the freeze elements.

While the primary cycle itself uses compressor gases to heat the freeze elements during the warming phase, and the released ice to chill the compressor gas in the melt shelf in the cooling phase, the cycle energies may not be sufficient to maintain the purified water tank 66 at a cold temperature solely by ice fragments that fall through the shelf, particularly when the tank is full and the device is not cycling. Therefore, in a preferred embodiment an auxilliary compressor 86 operably by a thermostatic control 87 provides a refrigerant to a cooling coil 88 immersed in the storage tank 66.

Figure 5:
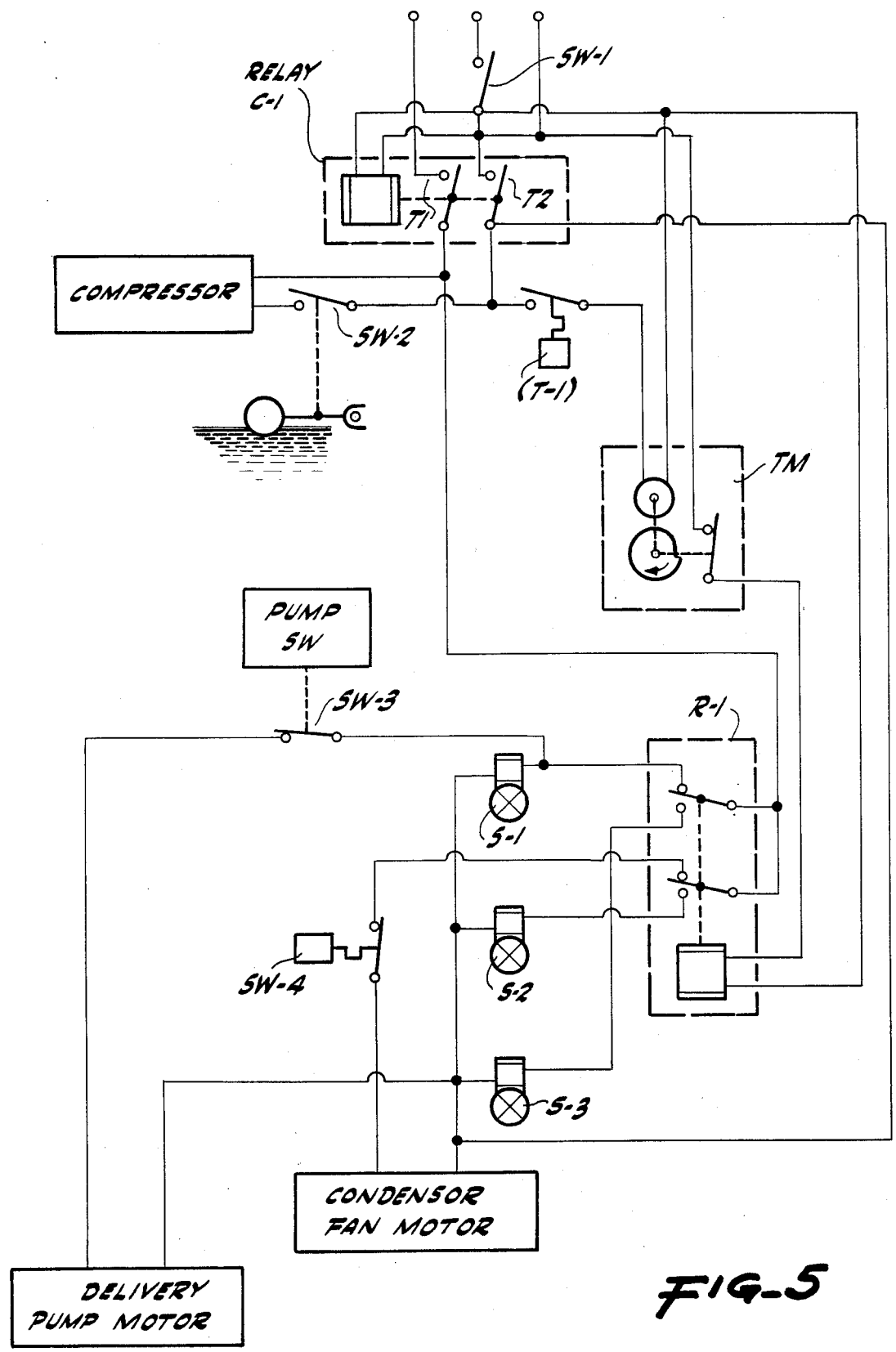
FIG. 5 is a schematic of the primary electrical circuits of the purifier.

Referring to FIGS. 4 and 5, the water purifier operates on a repeated cycle to provide an adequate reservoir supply of water for use. Once the master switch SW 1 is activated and the system operates to continuously form and release ice thimbles which melt to fill the reservoir 66, float 70 activates an overriding switch SW 2 to break the circuit to cease the cycling.

An individual cycle is approximately 18 minutes comprising approximately a 15 minute freeze segment where the compressor operates to provide condensed refrigerant to the freeze elements 27. In this mode, solenoid valve S-1 is open to allow return of the vaporized refrigerant to the accumulator 24 and compressor 20 for recycling. As ice collects on the freeze elements, the vaporized return refrigerant becomes progressively lower in temperature. At a cycle set temperature, sensed by T-1 in the suction line 25, a timer, TM is activated which trips relay R-1 for a period of approximately 2½ minutes to warm the freeze elements and release the formed ice thimbles. The relay automatically stops the circulating pump 38, without affecting the manual override switch SW-3, and, stops the condensor fan motor irrespective of the position of a thermostatic control switch SW-4 used as demand regulator to respond to the temperature of compressed refrigerant gas fed to the condenser which may vary outside of the ideal operating range between 110 and 130 degrees F. The relay R-1 also closes solenoid valve S-1 in the suction line 25, and opens solenoid valve S-3, regulated by manual set valve V-1, connecting the freeze elements 27 with a hot gas line 31 to deliver post compressor gas to the freeze elements to cause immediate warming. In addition the relay R-1 opens solenoid valve S-2, regulated by manuel set valve V-2 to open line 60, to allow warm gases to be returned to the compressor. Since the suction of the compressor may cause a vacuum chilling of the freeze elements, because of insufficient refrigerant return, a temperature controlled bypass valve, TXV, shunts refrigerant from feed line 30 to closed suction line 25 to provide refrigerant to the base of the freeze elements, allowing sufficient refrigerant for effective operation of the compressor. Bypass valve TXV is controlled by thermostat T-2 to prevent too much refrigerant to enter the freeze element and cause a chilling.

The warm gases to the freeze elements allow the ice thimbles to drop to the melt shelf 64, or where a center cover 67 is removed, to drop to the water tank 66, where chilled purified water is desired. When the timer TM has completed its phasing, the relay is deactivated and the system returns to the freeze segment of the cycle.

The preferred purifier unit 10 is equipped with complimentary components enhancing the unit for purified drinking water. To insure against any bacterial growth, an ultra violet purifier unit 90 is installed on the supply water line 92. Additionally, an activated charcoal filter unit 94 and flow meter 96 are installed on the delivery line 98 for purified water. As added assurance, where water use may be periodic, an additional ultra violet purifier unit 100 is installed at the outlet line 102.

As an auxilliary service, filtered water may be made available from the water purifier unit 10 by inclusion of a filter line 104 from the supply line 92 which includes an activated charcoal filter unit 106, a water meter 108 and a supplemental ultra violet purifier unit 110 before discharge from a common spigot 112.

Water may be selected by a coin operated selection box 114 as shown in FIG. 1 having an internal timing circuit to activate the line valve 116 for filtered water or supply pump 68 for purified water.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A water purifier comprising:
   a crystallizer chamber having a plurality of freeze elements in said chamber;
   a water supply conduit having at least one fine spray nozzle directed at said freeze elements;
   a pressurized water supply means for delivering contaminated water from a contaminated water source through said spray nozzle;
   means for periodically chilling said freeze elements to a sub-freezing temperature, when said water supply means directs a fine droplet spray at said freeze elements;
   means for periodically heating said freeze elements for releasing ice shells accumulated on said freeze elements;
   collection means for collecting ice shells released from said freeze elements, wherein said crystallizer chamber has a pair of opposed downwardly and outwardly sloping interior walls from which perpendicularly project said plurality of freeze elements.

2. The water purifier of claim 1 wherein said collector includes a melt unit for melting ice shells, and a water tank for holding melted water.

3. The water purifier of claim 2 wherein said means for periodically chilling said freeze elements comprises a refrigerant unit including a compressor for compressing a vaporized refrigerant and a condenser for condensing compressed refrigerant.

4. The water purifier of claim 3 wherein said melt unit includes a cooling means for cooling compressed refrigerant from said compressor.

5. The water purifier of claim 4 wherein said melt unit comprises a melt shelf onto which ice shells from said freeze elements are deposited, having a plurality of conduits through which compressed refrigerant is passed.

6. The water purifier of claim 5 wherein said melt shelf has removable cover means over an opening for passing ice shells through said melt shelf, when said cover means is removed.

7. The water purifier of claim 1 wherein said means for heating said freeze elements comprises a refrigerant unit including a compressor for compressing a vaporized refrigerant and a condensor for condensing compressed refrigerant, and an activatable bypass line for delivering compressed warm refrigerant from said compressor to said freeze elements.

8. The water purifier of claim 7 wherein said refrigerant unit includes a supply line for delivering condensed refrigerant from said condensor to said freeze elements and a suction line for delivering vaporized refrigerant from said freeze elements to said compressor.

9. The water purifier of claim 8 wherein said means for heating said freeze elements includes further an activatable bypass line for drawing compressed warm refrigerant from said freeze elements to said compressor.

10. The water purifier of claim 9 wherein said means for heating said freeze elements includes a bypass supply between said condensed refrigerant supply line and said activatable bypass line for passing adequate refrigerant for effective compressor operation.

11. The water purifier of claim 1 wherein said crystallizer chamber has a sloped bottom for runoff of water and released ice shells.

12. The water purifier of claim 11 wherein said sloped bottom is downwardly directed to a gutter having a sloped cover grate for separation of water and ice shells.

13. The water purifier of claim 12 wherein said gutter is directed to a brine reservoir for recycling the water from said reservoir to said spray nozzle.

14. The water purifier of claim 13 wherein said grate is directed to a water collecting means for collecting and melting ice shells for accumulation of purified water.

15. The water purifier of claim 14 wherein said collection means includes a storage tan for storing accumulated purified water.

16. The water purifier of claim 15 wherein said storage tank includes an auxilliary cooling unit for maintaining the tank water cool.

17. The water purifier of claim 1 wherein said pressurized water supply means comprises a storage reservoir and a water pump for delivering water from said storage reservoir to said spray nozzle under pressure.

18. The water purifier of claim 17 wherein said storage reservoir is connected by a supply line to an external water supply for supplementing water in said storage reservoir.

19. The water purifier of claim 18 having a brine sump wherein chilled brine is periodically discharged, said brine sump having a heat exchange coil through which the external water passes for prechilling.

20. The water purifier of claim 19 wherein said storage reservoir has means for periodically discharging water from said reservoir to said brine sump.

21. The water purifier of claim 20 wherein said discharge means comprises a syphon.

22. The water purifier of claim 1 having auxilliary purifying means for producing pure water.

23. The water purifier of claim 22 wherein said means comprises an ultra violet unit.

24. The water purifier of claim 22 wherein said means comprises a charcoal filter unit.

* * * * *